United States Patent [19]

Schafer

[11] Patent Number: 4,465,020

[45] Date of Patent: Aug. 14, 1984

[54] APPARATUS FOR PREVENTION OF FREEZING OF WATER LINE

[76] Inventor: Kenneth L. Schafer, Rte. 3, Box 73, Le Sueur, Minn. 56058

[21] Appl. No.: 416,896

[22] Filed: Sep. 13, 1982

[51] Int. Cl.³ .............................................. A01K 7/02
[52] U.S. Cl. .................................... 119/73; 137/564; 138/32
[58] Field of Search ............... 119/72 KS, 73, 74, 75, 119/78; 165/45; 137/564, 592, 301; 138/32

[56] References Cited

U.S. PATENT DOCUMENTS

| | | | |
|---|---|---|---|
| 1,576,218 | 3/1926 | Powell | 119/73 |
| 1,684,197 | 9/1928 | Petsch | 119/73 |
| 2,062,246 | 11/1936 | Atkinson | 138/32 |
| 2,932,313 | 4/1960 | Noland | 137/564 |
| 3,550,560 | 12/1970 | Edstrom . | |
| 3,563,264 | 2/1971 | Boegli . | |
| 3,691,997 | 9/1972 | Hatch . | |
| 3,820,508 | 6/1974 | Robinson . | |
| 3,949,707 | 4/1976 | Armstrong et al. | 119/73 |
| 4,078,524 | 3/1978 | Peterson et al. . | |
| 4,091,261 | 5/1978 | Noland | 119/73 |
| 4,100,885 | 7/1978 | Kapplinger | 119/73 |
| 4,149,491 | 4/1979 | Martin . | |
| 4,218,607 | 8/1980 | Noland | 119/73 |
| 4,248,177 | 2/1981 | Peterson et al. | 119/73 |
| 4,248,294 | 2/1981 | Budzynski et al. | 137/592 |
| 4,320,720 | 3/1982 | Streed | 119/73 |

Primary Examiner—Gene Mancene
Assistant Examiner—Kris R. Schulze
Attorney, Agent, or Firm—Burd, Bartz & Gutenkauf

[57] ABSTRACT

An animal watering apparatus has a thermal insulated tank having a water storage chamber. An upright tubular member located in the chamber has openings in its opposite ends to permit thermal circulation of the water in the chamber. Animal actuated water dispensing nipples mounted on the tank are surrounded with thermal insulated housings. Thermal insulated covers mounted on the housings with flexible sheets cover the outer ends of the nipples.

33 Claims, 15 Drawing Figures

APPARATUS FOR PREVENTION OF FREEZING OF WATER LINE

FIELD OF THE INVENTION

This invention relates to an apparatus for utilizing ground heat to prevent the freezing of water in a water line tank. The particular inventive field is an animal watering apparatus having animal actuated nipple valves.

BACKGROUND OF THE INVENTION

Animals, such as hogs, require a continuous supply of clean, fresh water. The water is supplied with animal watering systems located in animal confinement areas. In some locations during the winter months the atmospheric temperatures fall well below freezing. The cold temperature causes the watering systems to freeze up. In some watering systems heaters are used in the winter months to prevent the water from freezing. The heaters utilize an outside source of energy such as electricity or fuel oil. Examples of animal watering devices having heater elements to prevent the freezing of the water are disclosed by Peterson et al in U.S. Pat. Nos. 4,078,524 and 4,248,177. Peterson et al in U.S. Pat. No. 4,248,177 discloses an animal waterer having a recirculating water system that utilizes a heater element associated with pipes to provide for the heating and circulation of the heated water. The pipes are connected to valve actuated nipples secured to an upright housing. The watering nipples extend outwardly from the sides of the housing and are exposed to the cold atmospheric air. Shields located adjacent opposite sides of the nipples are used to require the animal to approach the nipples from a frontal position.

Armstrong et al in U.S. Pat. No. 3,949,707 disclose a livestock watering system that utilizes ground heat to minimize the freezing of water in a nipple type watering apparatus. The water is stored in a tank below ground. A pump connected to the tank delivers water via pipes to the watering nipples. The pump continuously operates to circulate the water in the pipes leading to and from the nipples. An outside source of power, such as electricity, is required to operate the motor driving the pump. When the pump is inoperative, water does not circulate to the nipples.

SUMMARY OF THE INVENTION

The invention comprises an apparatus for supplying a liquid, as water, which insulates the liquid from external temperatures that can freeze or heat the liquid. The apparatus utilizes ground heat to maintain the temperature of water substantially the same as the temperature of ground water. External sources of energy, such as electricity or fuel oil, are not required to prevent the water from freezing in cool weather.

According to the invention, there is provided a thermal insulated tank having a side wall surrounding a chamber accommodating water. The lower end of the tank is supported on the ground and connected to a water supply pipe. The tank can extend into the ground to locate the lower end thereof below the frost line. A separate heat retainer tank can be located in the ground below the thermal insulated tank. An upright tubular means is used to enhance thermal circulation of water in the chamber. The lower end of the tubular means is connected to a water inlet and the upper end thereof has openings or holes allowing water to flow into the upper portion of the chamber. The lower end of the tubular means has holes allowing the water in the lower portion of the chamber to flow into the upright passage of the tubular means when the temperature of the water in the lower portion of the chamber is higher than the temperature of the water in the upper portion of the chamber. This circulation of the water inhibits freezing of water in the chamber. Water outlet means mounted on the tank function to allow water to be drawn from the chamber. In one embodiment, the water outlet means includes a pipe and valve for carrying water from the tubular means and chamber to a desired location. In another embodiment, the water outlet means includes an animal operated valve nipple.

A preferred embodiment of the apparatus has a thermal insulated tank having a side wall surrounding a water storage chamber. The tank has a bottom having water inlet means adapted to be connected to a supply of water under pressure, such as an underground water line or a heat retainer tank connected to a water line. An upright tubular means located along the longitudinal axis of the chamber carries the water from the water inlet means to the upper portion of the chamber. The lower end of the tubular means has holes which allow the water in the lower portion of the chamber to flow into the passage of the tubular means. This promotes thermal circulation of water in the chamber. Warm water in the lower portion of the chamber will flow up the tubular means and cool water in the upper portion of the chamber will flow downwardly to the lower portion of the chamber.

Water is drawn from the tank with the use of a tubular member cooperating with a valve. In one embodiment, animal operated means are mounted on the side wall of the tank to dispense or discharge water from the chamber. The animal operated means comprise a plurality of valve nipples that project outwardly from the side wall at locations that are accessible to animals, as hogs. Each nipple is enclosed within a thermal insulated housing having an opening for the nipple. A thermal insulated cover extends over the opening. Flexible sheet means, such as a rubber sheet, mounts the cover on the housing in a manner to permit an animal to move the cover to an open position so that the animal has access to the nipple. The housing has upright ribs adjacent opposite sides of the opening to protect and insulate the nipple. The cover and sheet means are located between the ribs when the cover is in its closed position. The thermal insulated housing and cover prevents water from freezing in the nipple in cold weather and maintains the water cool in hot weather.

The heat retainer tank has thermal insulated side walls and end walls surrounding a chamber for accommodating water. The tank is located in an upright position in the ground with the lower end preferably positioned below the normal frost line. The underground water supply line is connected to the bottom of the tank to discharge water into the chamber. The top of the tank has a water outlet. An elongated tubular member secured to the top wall extends down into the chamber. The lower end of tubular member is open and terminates adjacent the bottom wall. The upper end of tubular member has openings to allow warm water in the bottom of the chamber to flow up the tubular member and out through the openings into the top of the chamber. This natural thermal circulation of water in the chamber is continuous and prevent freezing of the water in the chamber. The heat from the ground and ground water maintains the water in the chamber at temperatures above freezing.

The water dispensing apparatus is efficient and economical in use. The water dispensing apparatus and heat retainer tank can be installed in remote locations having a source of water under pressure as they do not require electrical or gas connections nor outside energy for heaters and thermostats.

DESCRIPTION OF PREFERRED EMBODIMENTS

Figure 1:
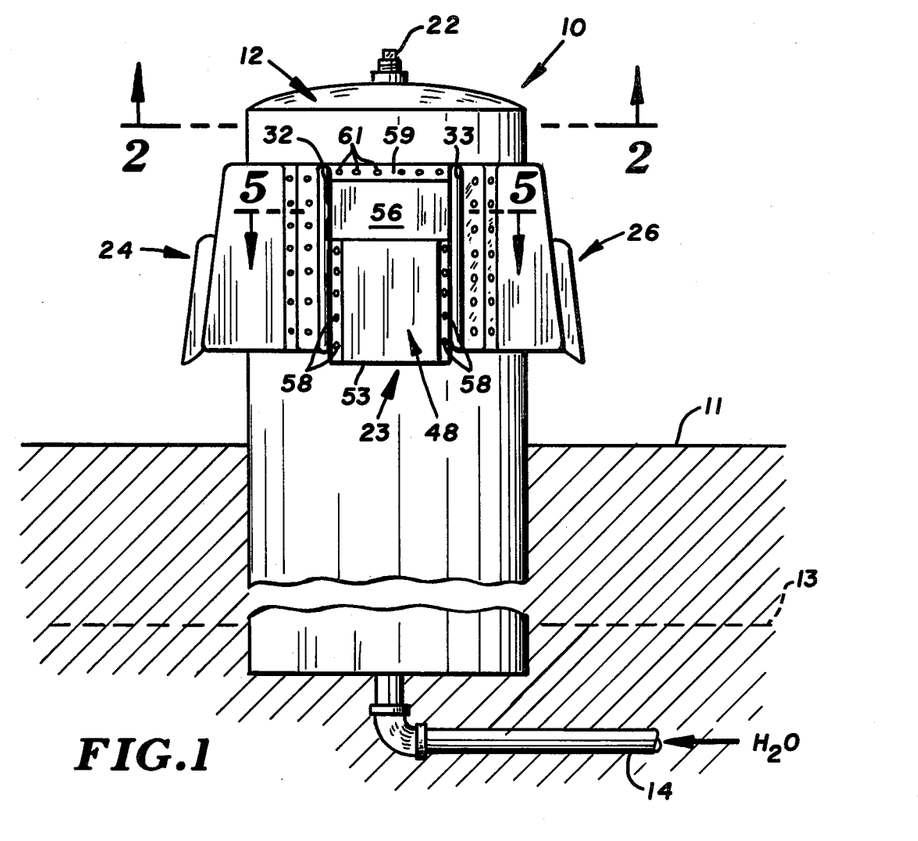
FIG. 1 is a foreshortened side elevational view of an animal watering apparatus having a water line tank of the invention.
Figure 2:
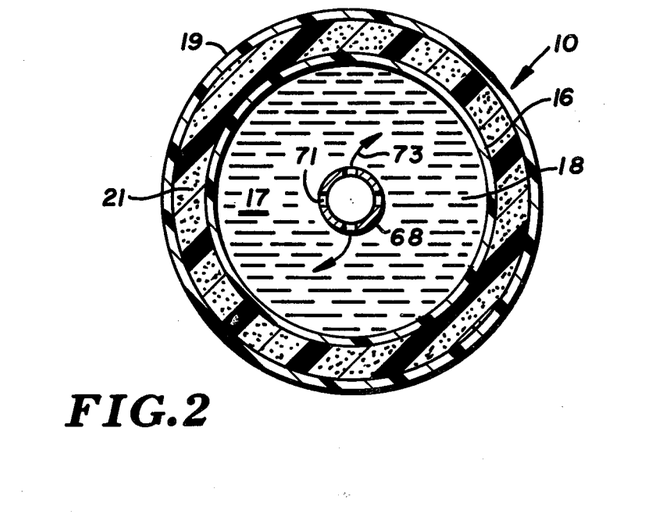
FIG. 2 is a sectional view taken along the line 2—2 of FIG. 1.
Figures 3, 4, 5:
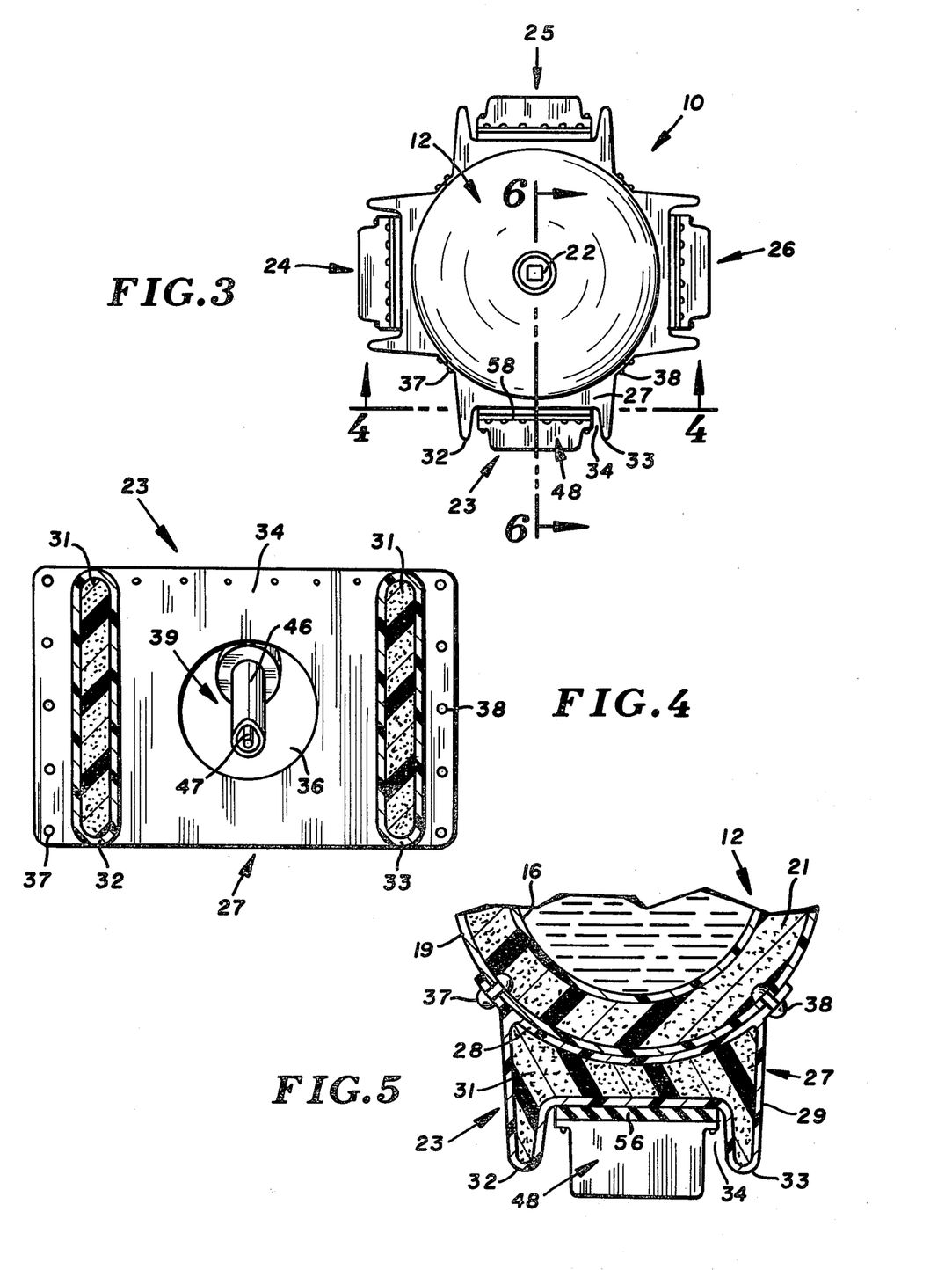
FIG. 3 is a top view of FIG. 1.
FIG. 4 is an enlarged sectional view taken along the line 4—4 of FIG. 3.
FIG. 5 is an enlarged sectional view taken along the line 5—5 of FIG. 1.

Referring to FIG. 1, there is shown an animal watering apparatus indicated generally at 10 used as a self-watering device for hogs and small animals. Apparatus 10 is hereinafter described as an animal watering apparatus operated by the animal to provide drinking water. The apparatus can be used with other liquids to dispense the liquid and prevent the liquid from freezing. Apparatus 10 anchored on ground 11 utilizes the ground water heat to minimize the freezing of the water in the apparatus and water dispensing nipples. Apparatus 10 has an upright generally cylindrical tank 12. Tank 12 can be supported on and attached to a concrete platform or like support or extend into the ground. As shown in FIG. 2, tank 12 is a thermal insulated container accommodating a body of water 18. Tank 12 has an inner cylindrical wall 16 surrounding a chamber 17 accommodating water 18. An outer wall 19 is located about inner wall 16. A core 21 of foam material, as urethane, is located between and bonded to walls 16 and 19. Walls 16 and 19 are rigid plastic reinforced with glass fibers. The top of tank 12 is generally dome-shaped and contains a removable plug 22. As shown in FIG. 3, a plurality of drinking stations 23, 24, 25 and 26 are secured to the side of tank 12. Drinking stations 23-26 are identical in structure and function and are circumferentially located about tank 12. Apparatus 10 can have one or more drinking stations. Preferably, the apparatus has two or four drinking stations. The following description is limited to drinking station 23.

As shown in FIGS. 1, 4, and 5, drinking station 23 has a thermally insulated housing 27 comprising a concave curved inside wall 28 adapted to be located in engagement with the outside wall of tank 12. An outside wall 29 secured to the opposite sides of inside wall 28 surrounds a core 31 of foam material providing housing 27 with thermal insulating characteristics. Housing 27 has a pair of upright side ribs 32 and 33 located on opposite sides of a generally upright channel 34. As shown in FIG. 4, the central portion of housing 27 has a central opening 36. A plurality of fasteners 37 and 38 secure opposite sides of housing 27 to the outside wall of tank 12.

A nipple assembly indicated generally at 39 is mounted on tank 12 in alignment with opening 36. Nipple assembly 39 has a tubular body 41 extended through an outward projection 42 in the side wall of tank 12. The body 41 is mounted in sealed relation with respect to projection 42 to prevent leakage of water through the hole in projection 42. Projection 42 has a pocket 43 allowing water to circulate adjacent to the entrance to nipple assembly 39 thereby preventing water from freezing in the nipple. Nipple assembly 39 has an outwardly projected spout 46 joined to tubular body 41. The spout 46 accommodates a stem 47 secyred to a valve (not shown). When stem 47 is moved from its normally closed longidtudinal position, the valve is opened allowing water to flow through the nipple assembly. Examples of nipple valves of this type are disclosed in U.S. Pat. Nos. 3,550,560 and 4,248,177.

Figure 6:
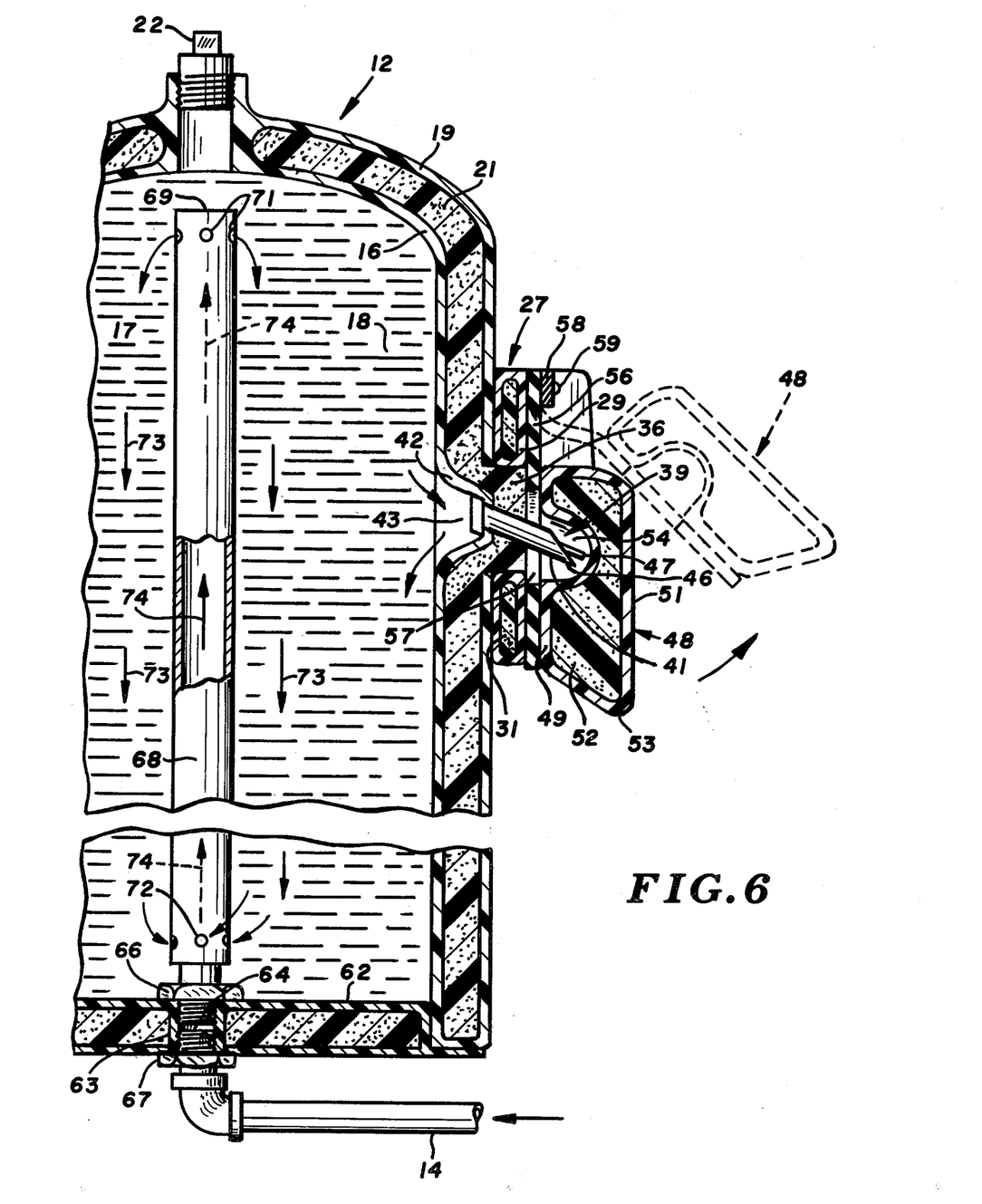
FIG. 6 is an enlarged foreshortened sectional view taken along the line 6—6 of FIG. 3.

A thermal insulated cover or door indicated generally at 48 covers the outside of nipple assembly 39. As shown in FIG. 6, cover 48 has an inside wall 49 joined to an outside wall 51. A core 52 of thermal insulating material such as foam plastic, or urethane, is located between walls 49 and 51. Inside wall 49 has a pocket or recess 54 accommodating the outer end of spout 46. Cover 48 is mounted on a generally flat, flexible sheet member 46. The sheet member is preferably a flat, rubber sheet located in engagement with the outside wall 29 of housing 27 between ribs 32 and 33. A plurality of fasteners such as bolts or rivets 58 secure cover 48 to sheet member 56. The upper end of sheet member 56 is mounted on housing 27. A transverse bar 59 accommodates a plurality of fasteners 61 for securing the transverse upper edge of sheet member 56 to the top of housing 27 between ribs 32 and 33. The weight of cover 48 holds the sheet member 56 and cover 48 in closed relation relative to opening 36 and nipple assembly 39. The sheet member 56 is located in channel 34 in surface engagement with the outer wall 29 of housing 27.

The cover 48 is moved to its open position as shown in broken lines in FIG. 6 by the animal engaging the lower lip 53. The sheet member 56 is flexed to allow the animal access to spout 46. Manipulation of valve stem 47 by the animal opens the valve so that the water under pressure in tank 12 flows through the nozzle assembly 39 into the mouth of the animal. When the animal moves out of engagement with cover 48, the weight of the cover 48 will immediately cause the cover 48 to move to its closed position as shown in full lines in FIG. 6.

Referring to FIG. 6, the tank 12 has a thermal insulated bottom 62. The center of bottom 62 has a cylindrical boss 63 accommodating a tubular coupling 64. Nuts 66 and 67 secure coupling 64 to bottom 62 on boss 63. The bottom 62 of tank 12 comprises inner and outer walls and a core of thermal insulation.

The inlet line 14 is secured to the inlet side of coupling 64 to deliver water under pressure to coupling 64. A generally upright tubular member or pipe 68 is secured to the upper or inner side of coupling 64. Pipe 68 extends along the longitudinal axis of chamber 17. The upper end of pipe 68 is in general alignment with plug 22. The upper end of pipe 68 has an open end 69 and a plurality of upper side holes 71. The lower end of pipe 68 adjacent coupling 64 has a plurality of lower holes 72. The open end 69 and upper and lower holes 71 and 72 allow the thermal circulation of water 18 in chamber 17 as shown by the arrows 73. The water supplied to the tank is carried via the pipe 68 to the top of the tank. The cool water at the top of the tank will flow downwardly as indicated by the arrows 73 with the warmer water from the bottom of the tank moving upwardly in the passage of the tubular member 68 as indicated by the arrows 74. The water in the lower portion of the tank will be heated or cooled, depending on its temperature, to the ground temperature. The thermal circulation of the water 18 in tank 17 prevents the water from freezing in tank 12 in the winter and provides for cool water in the summer.

Figures 7, 8, 9:
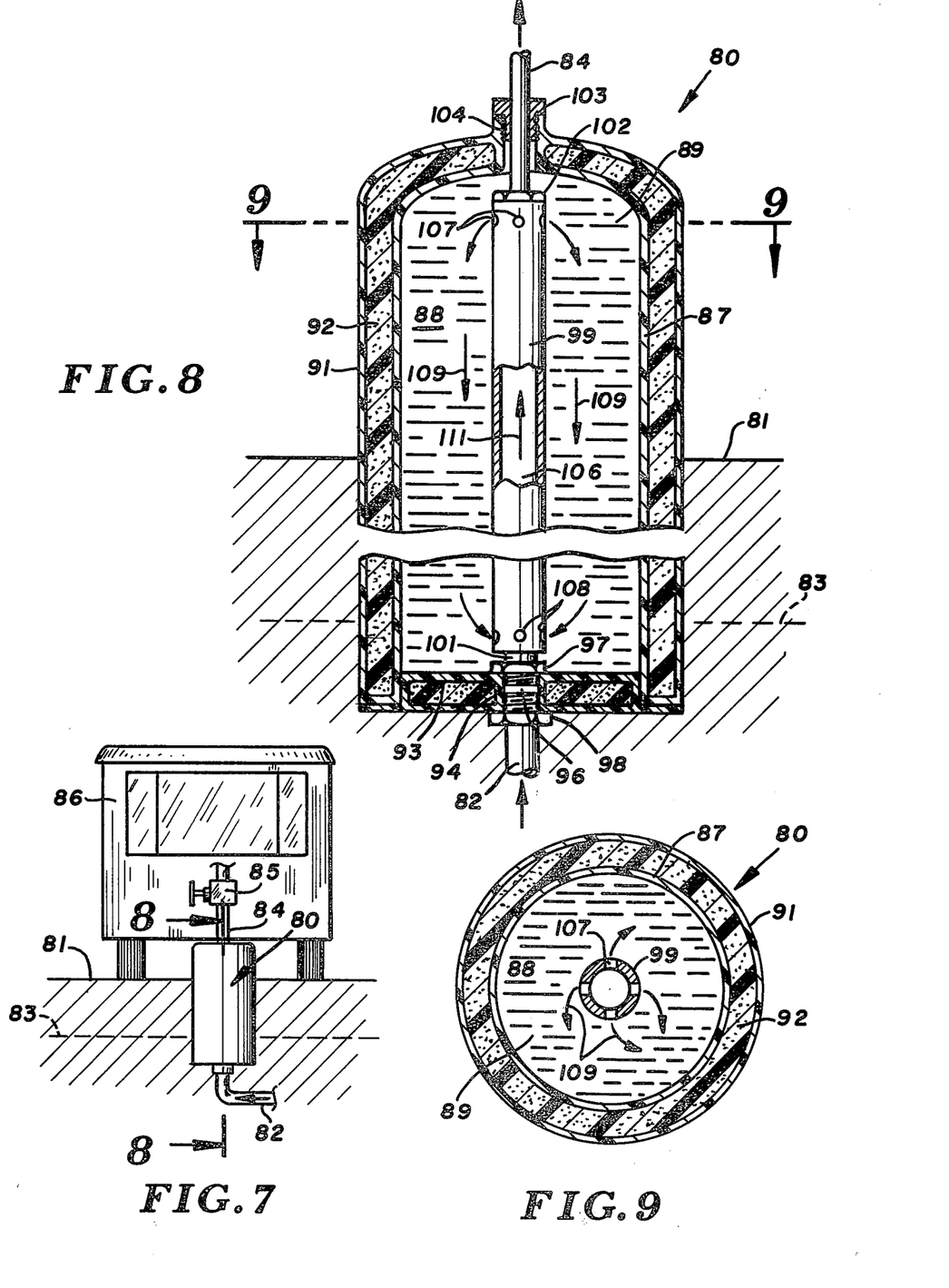
FIG. 7 is an elevational view of the water line tank of the invention used to supply water to a building.
FIG. 8 is an enlarged foreshortened sectional view taken along the line 8—8 of FIG. 7.
FIG. 9 is a sectional view taken along the line 9—9 of FIG. 8.

Referring to FIGS. 7 to 9, there is shown a water line tank indicated generally at 80 anchored in the ground 81 and connected to an underground water pipe 102. The lower end of tank 80 and water pipe 82 located below frost line 83 is shown as a broken line in ground 81. The upper end of tank 80 is connected to a water pipe 84 leading to an on-off valve 85 in a structure 86. The structure 86 can be a mobile home, a trailer, a shed or the like.

Tank 80 is a cylindrical structure having an inner wall 87 surrounding a chamber 88 accommodating water 89. An outer wall 91 surrounds inner wall 87 and is separated therefrom with a thermal insulating core 92. Core 92 can be a foam plastic, such as urethane foam. The bottom of the tank 80 is closed with a bottom wall 93. The bottom wall 93 has a central boss 94 accommodating a tubular coupling 96. Nuts 97 and 98 secure and seal coupling 96 to wall 93 and boss 94. The inlet or outside of coupling 96 is connected to the water supply pipe 82.

An upright tubular member or pipe 99 is located longitudinally in chamber 88. The lower end of pipe 99 is connected to a short nipple 101 secured to the outlet side of coupling 96. The upper end of pipe 99 is secured to an adapter 102. The adapter 102 has a central hole for accommodating a threaded end of outlet pipe 84. Adapter 102 can be a plug threaded into the upper end of pipe 99. Outlet pipe 84 extends through a collar 103 threaded into a hole 104 in the top of tank 80. Pipe 99 has a longitudinal passage 106 for carrying water from coupling 96 to outlet pipe 84. The upper end of pipe 99 has a plurality of holes 107 allowing water to flow into the tank chamber 88. The lower end of pipe 99 has a plurality of holes 108 located adjacent nipple 101 allowing the water in the lower portion of chamber 88 to flow into pipe passage 106.

In use, the water 89 in chamber 88 has natural thermal circulation. The water in the bottom of the tank is warmed to ground water temperature. In the event that the temperature of the water in the bottom of the tank is greater than the temperature in the top of the tank, the warm water will flow through holes 108, up passage 106, and through holes 107 into chamber 88. The cold water in the top of the tank will flow downwardly as indicated by the arrows 109. The upward flow of the warm water in passage 106 is indicated by the arrow 111. The continuous circulation of the water 89 in tank chamber 88 caused by the differences in the temperature between the water in the upper and lower portions of the tank prevents the freezing of the water in the tank and the water in the pipes 99 and 84. The water 89 surrounding pipe 99 also further insulates the water in pipe 99.

Referring to FIGS. 10–13, there is shown a water fountain indicated generally at 115. Fountain 115 has water discharge means, shown as a freeze-free valve unit, indicated generally at 120. Water fountain 115 is supported on the ground 116 and is supplied from water from an underground water heat retainer or tank 118 connected to an underground water supply pipe 117. The fountain 115 has a thermal insulated tank 119. Freeze-free valve unit 120 is mounted on the tank operable to provide a passage for carrying water from the tank to a desired location.

Figure 12:
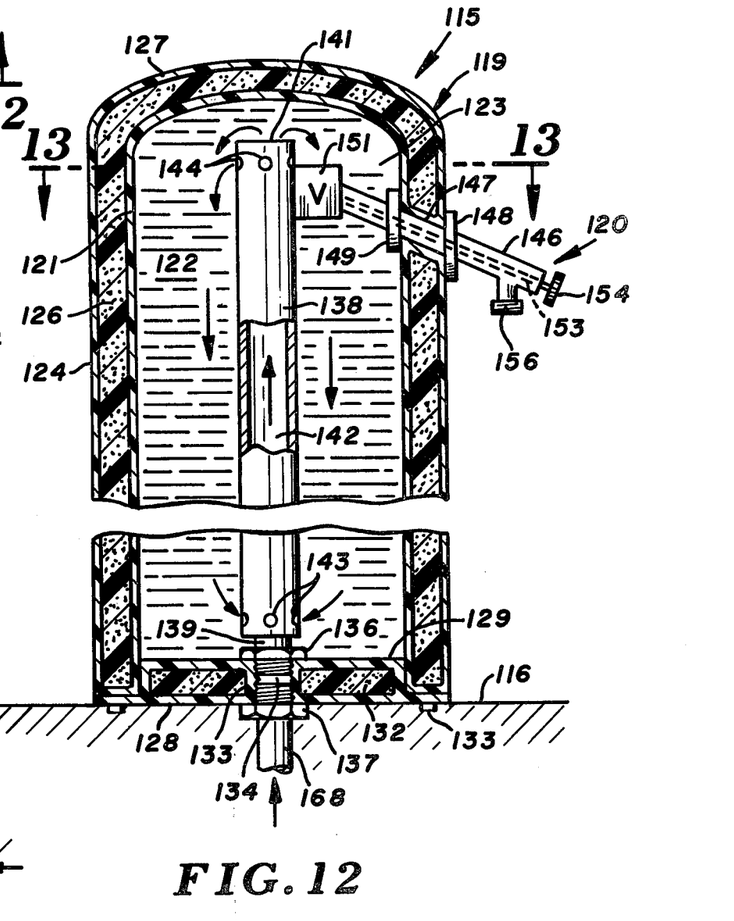
FIG. 12 is an enlarged foreshortened sectional view taken along the line 12—12 of FIG. 11.
Figure 13:
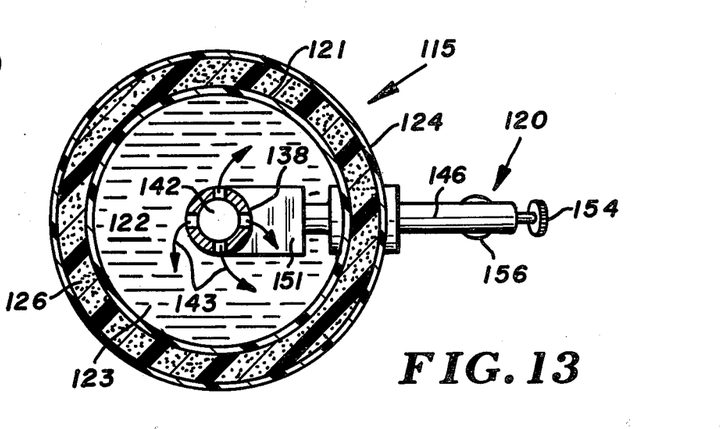
FIG. 13 is a sectional view taken along the line 13—13 of FIG. 12.

As shown in FIG. 12, tank 119 has an inner wall 121 surrounding a chamber 122 for storing water 123. An outer wall 124 surrounds an inner wall 121 in the space therefrom with a thermal insulating core 126 of expanded foam plastic, such as urethane foam. Inner and outer walls 121 and 124 extend upwardly and enclose the top of the tank 119 and form a dome top wall 127. The bottom of tank 119 is closed with a bottom wall 128. Bottom wall 128 has thermally insulated inner and outer walls 129 and 131 and a core of foam plastic 132 of urethane foam. A plurality of fasteners 133 are used to mount the bottom wall 128 on the lower ends of the side wall of the tank. The center of bottom wall 128 has a boss 133 accommodating a tubular coupling 134. Coupling 134 is connected to the inlet water pipe 117. Nuts 136 and 137 secure and seal the coupling to bottom wall 128. Other tubular conecting structures can be used to attach the water pipe 117 to bottom wall 128 and deliver a supply of water to tank chamber 122.

An upright tubular member or pipe 138 is located along the upright longitudinal axis chamber 122. The lower end of tubular member 138 is connected to a short nipple 139 secured to the outlet side of coupling 134. The upper end of the pipe is spaced a short distance below the top wall 127 and has an open upper end 141 and in communication with a longitudinal passage 142 for carrying water from the nipple 139 to the top of tank chamber 122. The bottom of tubular member 138 has a plurality of holes 143. The top of tubular member 138 has a plurality of similar holes 144. The water 123 in chamber 122 has natural thermal circulation. The water in the bottom of chamber 122 is warmed by the incoming water to water or ground temperature. In the event that the temperature in the water in the bottom of the tank is greater than the temperature in the top of the tank, the warm water will flow through the holes 143, up passage 142 and into the top of the tank through holes 144 at the open top of tubular member 138. The continuous circulation of the water 123 in the tank caused by the differences in temperature between the water in the upper and lower portions of the tank prevents the freezing of the water in the tank chamber 122. The ground water has a temperature between 44–80 degrees, depending on the geographical location. Water at 39 degrees F. has its heaviest density so that water at or near 39 degrees will circulate to the bottom of chamber 122. The water colder than 39 degrees is lighter and therefore will circulate upward and be warmed by the water in passage 142.

The freeze-free valve unit 119 has an elongated tubular member 146 or body extended through an inclined hole 147 in the side wall of the tank 115. Mounting seals 148 and 149 secure body 146 to the tank side wall. The inner end of body 146 located in chamber 122 is attached to an on-off valve 151. On-off valve 151 is connected to a short boss 152 joined to tubular member 138. The boss 152 has a passage for carrying water from passage 142 to valve 151. Valve 151 is connected to an elongated rod 153 located within body 142. The outer end of rod 153 is secured to a hand operated wheel 154. A downwardly directed discharge spout 156 is integral with the outer end of body 146. Hand wheel 154 is rotated to selectively open and close valve 151. When valve 151 is open, the water flows through tubular body 146 and is discharged through discharge spout 156. When valve 151 is closed, the water in tubular body 146 drains out through discharge valve 156 so that water cannot freeze in tubular body 156.

Figure 10:
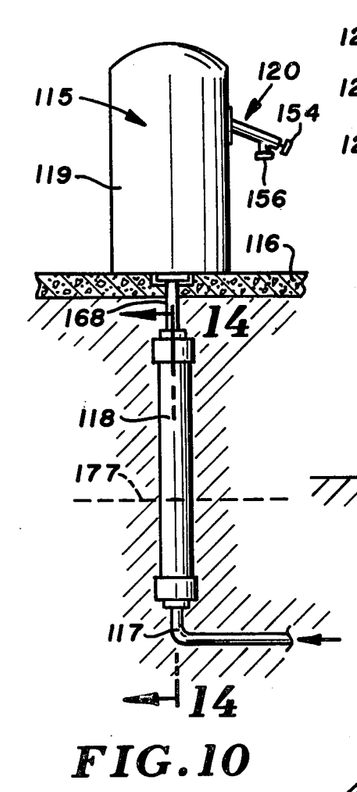
FIG. 10 is an elevational view of a water fountain and heat retainer tank according to the invention.
Figure 11:
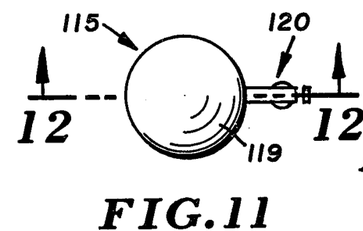
FIG. 11 is a top view of FIG. 10.

As shown in FIG. 10, heat retainer unit 118 is located upright in the ground below tank 119. The bottom of retainer unit 118 is connected to the underground water supply pipe 117. The water moves through the heat retainer unit 118 and into the tank 119.

Figures 14, 15:
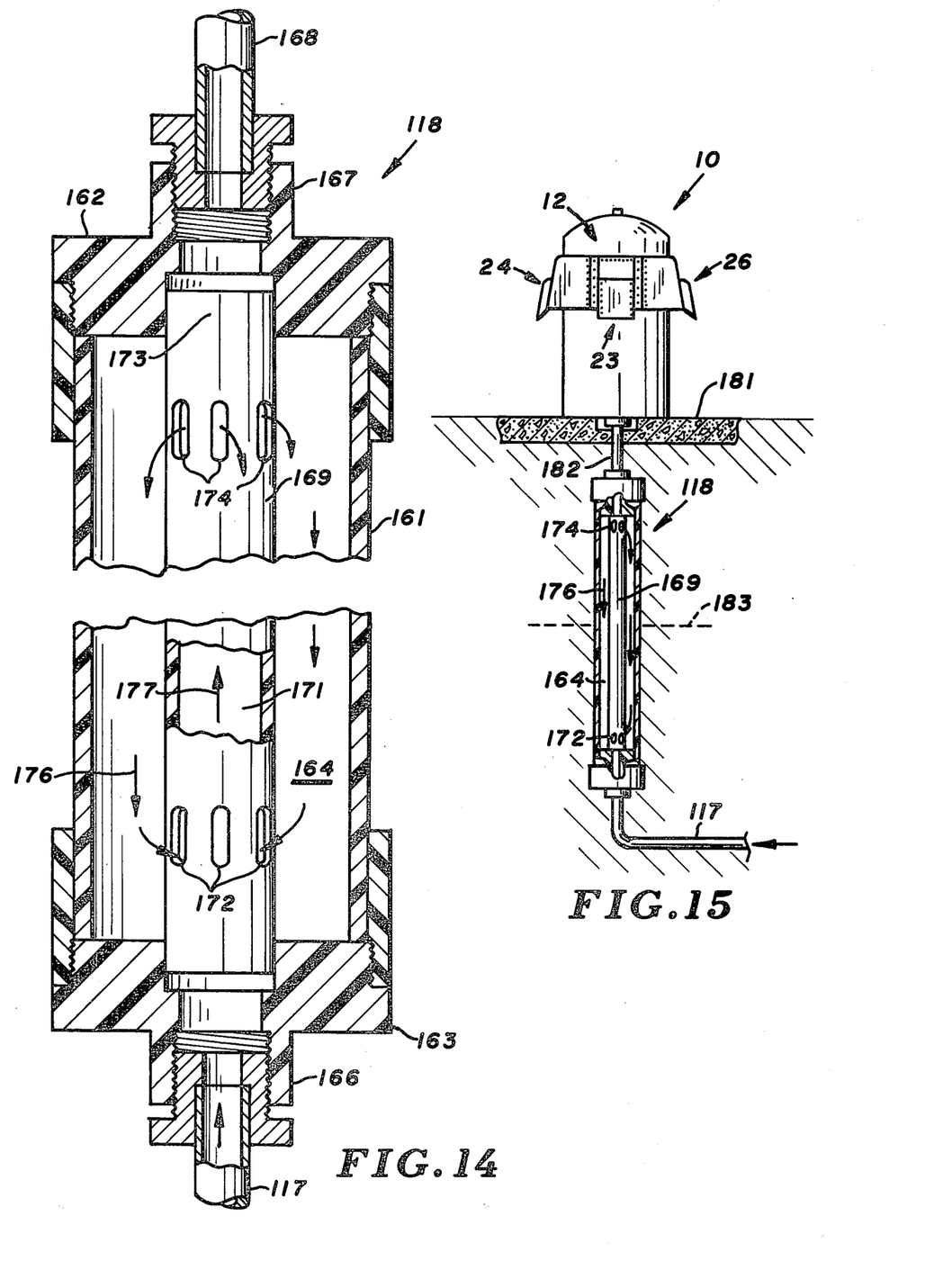
FIG. 14 is an enlarged fragmentary sectional view taken along the line 14—14 of FIG. 10.
FIG. 15 is an elevational view of an animal drinker of FIG. 1 connected to a heat retainer tank according to the invention.

Referring to FIG. 14, heat retainer unit 118 has a cylindrical side wall 161 joined to top wall 162 and bottom wall 163. The walls 161, 162, and 163 are made of thermal isulation, such as plastic, foam plastic, and the like. The walls 161–163 can have the same construction as the walls of tank 119. The walls 161, 162, and 163 surround a generally cylindrical chamber 164 for accommodating water. Bottom wall 163 has a central tubular neck 166 accommodating a threaded end of water pipe 117. Water is supplied to chamber 164 via pipe 117. Top wall 162 has an outwardly central tubular boss 167 accommodating a short pipe 168 connected to the bottom of tank 119. Water flows through boss 167 and pipe 168 into the tank chamber 122.

The natural thermal circulation of the water is facilitated with a longitudinal upright tubular member 169 located in chamber 164. Tubular member 169 has a longitudinal upright passage 171 having a lower end with holes 172. The lower end is located in the outlet passage of wall 163. The upper end 173 of member 169 is located in the inlet passage of top wall 162. End 173 carries water from passage 171 into boss 167 and pipe 168. The upper end of tubular member 169 has a plurality of circumferentially spaced holes 174 allowing water in passage 171 to flow into the top area of chamber 164. The water circulates in tank chamber 164 in response to temperature differences between the water in the upper and lower portions of the tank chamber 164. The cold water in the upper portions of tank chamber 164 flows downwardly, as indicated by arrows 176. The warm water in the lower end of chamber 164 flows through holes 172 upwardly in passage 171 and through holes 174 into the upper end of chamber 164. This thermal circulation of the water is continuous and inhibits the freezing of the water in tank chamber 164. As shown in FIG. 10, the lower end of the heat retainer unit 118 is located below the normal frost line 177 whereby the ground temperature and the ground water temperature continuously transfers heat to the water in the bottom of the tank chamber 164. The temperature of the water will range from 40–80 degrees, depending on the geographical location.

Referring to FIG. 15, there is shown the animal watering apparatus 10 supported on a concrete platform 181. Watering apparatus 10 is identical to the apparatus shown and described herein with regard to FIGS. 1–6. The heat retainer unit 118 is located upright below platform 181 in the ground with the lower end thereof located below the normal frost line 183. The lower end of unit 118 is connected to the underground water supply pipe 117. A short upwardly directed pipe 182 connects the top of heat retainer unit 118 to the bottom of the tank 12, so as to provide a water supply for tank 12. The water in tank chamber 164 has natural thermal circulation, as indicated by arrows 176. The water in the supply pipe 117 and the lower end of tank chamber 164 has a temperature substantially the same as the ground temperature. This temperature ranges from 40–80 degrees, depending on the geographical location.

The warm water in tank 164 flows through the open lower end 172 of tubular member 169 and is discharged via holes 174 to the upper region of tank chamber 164. The cold water in the upper region of tank chamber 164 flows downwardly, as indicated by arrows 176 to the bottom of tank chamber 164. The heat retainer unit 118 provides the tank 12 with a continuous source of frost-free water.

While there has been shown and described preferred embodiments of the invention, it is understood that numerous variations and modifications may be made by those skilled in the art without departing from the invention. The invention is defined in the following claims.

The embodiments of the invention in which an exclusive property or privilege is claimed are defined as follows:

1. An animal watering apparatus comprising: a tank having thermal insulated wall means surrounding a chamber having a generally upright longitudinal axis, an upper portion and a lower portion for accommodating water, said tank having a side wall and bottom wall, water inlet means connected to said bottom wall adapted to be connected to a supply of water under pressure, tubular means connected to the water inlet means located generally along the longitudinal axis of the chamber, said tubular means extended from the bottom wall to the upper portion of said chamber, said tubular means having a passage and open upper end for carrying water from the water inlet means to the upper portion of said chamber, hole means in the lower end of the tubular means open to the chamber and passage whereby water in the lower portion of the chamber flows through said hole means into the passage to the upper portion of said chamber and water in the upper portion of the chamber flows to the lower portion of the chamber when the temperature of the water in the lower portion of the chamber is greater than the temperature of the water in the upper portion of the chamber, animal operated means for dispensing water mounted on said side wall and protruding outwardly therefrom, thermal insulated housing means mounted on the side wall surrounding said animal operated means, said housing means having laterally disposed generally upright ribs and an opening located between said ribs for said animal operated means, thermal insulated cover means located between said ribs covering said opening, generally vertical flexible sheet means secured to said cover means and extending substantially across the upper width of said cover means, means securing a portion of the sheet means to the housing means between said ribs and above the cover means whereby the cover means can be moved by an animal to an open position providing access to the animal operated means for dispensing water.

2. The apparatus of claim 1 wherein: said tubular means comprises a generally cylindrical tubular member having a lower end connected to the water inlet means.

3. The apparatus of claim 1 wherein: said bottom wall is a thermal insulating member adapted to be connected to a water line for supplying water to said chamber.

4. The apparatus of claim 1 wherein: a plurality of animal operated means are mounted on the tank means, each of said animal operated means being enclosed within thermal insulated housing means and covered with cover means mounted on the housing means.

5. The apparatus of claim 1 wherein: said animal operated means includes a tubular member extended to the central portion of the chamber for carrying water to a water discharge nipple located externally of the side wall.

6. The apparatus of claim 1 wherein: said cover means has a lower transverse lip adapted to be engaged by an animal to move the cover means upwardly to an open position.

7. The apparatus of claim 1 wherein: said cover means has an inside wall, said inside wall having a recess accommodating an outer portion of the animal operated means when the cover means is in its closed position.

8. The apparatus of claim 7 including: a flexible sheet member is secured to the inside wall of the cover means.

9. An animal watering apparatus comprising: thermal insulated tank means having a side wall, a topwall, and bottom wall surrounding a chamber accommodating water, water inlet means adapted to be connected to a supply of water under pressure for directing water into the chamber, said water inlet means being connected to said bottom wall, upright tubular means mounted on said water inlet means for receiving water from the water inlet means, said tubular means having upper and lower opening means to allow water to flow into said chamber and permit the circulation of water in said chamber, animal operated means for dispensing water mounted on a side wall and protruding outwardly therefrom, said housing means having an opening surrounding the animal operated means and laterally disposed generally upright ribs, thermal insulated cover means located between said ribs covering said opening, generally upright flexible sheet means extending substantially across the upper width of the cover means and mounting the cover means to said housing means to permit movement of the cover means by an animal from the closed position to an open position providing animal access to said animal operated means, and means securing the sheet means to the housing means above the cover means.

10. The apparatus of claim 9 wherein: a plurality of animal operated means are mounted on the tank means, each of said animal operated means being enclosed within thermal insulated housing means and covered with cover means mounted in the housing means.

11. The apparatus of claim 9 wherein: said animal operated means includes a tubular member extended to the central portion of the chamber for carrying water to a water discharge nipple located externally of the side wall.

12. The apparatus of claim 9 wherein: said cover means has a lower transverse lip adapted to be engaged by an animal to move the cover means upwardly to an open position.

13. The apparatus of claim 9 wherein: said cover means has an inside wall, said inside wall having a recess accommodating an outer portion of the animal operated means when the cover means is in its closed position.

14. An animal watering apparatus comprising: thermal insulated tank means having a side wall, a topwall and a bottom wall surrounding a chamber accommodating water, water inlet means connected to the bottom wall adapted to be connected to a supply of water under pressure for directing water into the chamber, upright tubular means mounted on said water inlet means for receiving water from the water inlet means, said tubular means having an upper and lower opening means to allow water to flow into said chamber and permit circulation of water in said chamber, animal operated means for dispensing water mounted on a side wall and protruding outwardly therefrom, thermal insulated housing means mounted on the side wall, said housing means having an opening surrounding the animal operated means, thermal insulated cover means covering said opening, generally upright flexible means extending substantially across the upper width of the cover means and mounting the cover means to said housing means to permit movement of the cover means by an animal from the closed position to an open position providing animal access to said animal operated means, said cover means having a lower transverse lip adapted to be engaged by an animal to move the cover means upwardly to bend the flexible means and locate the cover means in an open position, said cover means having an inside wall, said inside wall having means accommodating an outer portion of the animal operated means when the cover means is in its closed position, and means securing the flexible means to the housing means above the cover means.

15. The apparatus of claim 14 wherein: a plurality of animal operated means are mounted on the tank means, each of said animal operated means being enclosed within thermal insulated housing means and covered with cover means mounted on the housing means.

16. The apparatus of claim 14 wherein: said animal operated means includes a tubular member extended to the central portion of the chamber for carrying water to a water discharge nipple located externally of the side wall.

17. The apparatus of claim 14 wherein: said flexible means mounting the cover means to said housing means includes a flexible sheet member attached to the inside wall of the cover means, and said means securing the flexible means to the housing means comprises means connecting a transverse upper portion of the sheet member to the housing means.

18. An apparatus for supplying water comprising: thermal insulated tank means having a side wall, top wall, and bottom wall surrounding a chamber having a generally upright longitudinal axis, an upper portion and a lower portion for accommodating water, said bottom wall having water inlet means, said top wall having water outlet means, tubular means having a passage located in said chamber, said tubular means having a first end connected to the bottom wall in communication with the water inlet means to receive a supply of water into said passage, said tubular means having a second end in the upper portion of the chamber, means mounted on the top wall for supporting the second end of the tubular means and carrying water from the passage to the water outlet means, said tubular means having hole means adjacent the first end thereof open to the passage and chamber, said second end having opening means open to the passage and chamber whereby water in the lower portion of the chamber flows through said hole means into the passage and out of the opening means to the upper portion of said chamber and water in the upper portion of the chamber flows to the lower portion of the chamber when the temperature of the water in the lower portion of the chamber is greater than the temperature of the water in the upper portion of the chamber.

19. The apparatus of claim 18 wherein: said means mounted on the top wall comprising a pipe connected to the second end of the tubular mmeans.

20. The apparatus of claim 18 wherein: said opening means includes at least one hole in the second end of the tubular means.

21. The apparatus of claim 18 wherein: said tubular means is a generally cylindrical tubular member located along the longitudinal axis of the chamber.

22. The apparatus of claim 18 wherein: the bottom wall is a heat conducting member adapted to conduct ground heat to the water in said chamber.

23. The apparatus of claim 18 wherein: said bottom wall has means mounting the first end of the tubular means on the bottom wall.

24. The apparatus of claim 18 wherein: said top wall has means mounting the second end of the tubular means on the top wall.

25. The apparatus of claim 18 wherein: said bottom wall has first means mounting the first end of the tubular means on the bottom wall, and the top wall has second means mounting the second end of the tubular means on the top wall to locate the tubular means longitudinally in said chamber.

26. The apparatus of claim 25 wherein: said first means includes a water outlet passage in the bottom wall, and said second means includes a water inlet passage in the top wall, said first end of the tubular means being located in said outlet passage, and said second end of the tubular means being located in the inlet passage.

27. An apparatus for supplying water comprising: tank means having a side wall, top wall, and bottom wall surrounding a chamber having a generally upright longitudinal axis, an upper portion and a lower portion for accommodating water, said bottom wall having a water inlet passage, tubular means having a passage located in said chamber for carrying water, said tubular means mounted on said tank means, said tubular means having a first end located in the lower portion of the chamber and a second end in the upper portion of the chamber, said first end having a portion located in the water inlet passage and mounted on the bottom wall, said second end having a portion located in the water outlet passage and mounted on the top wall, water outlet means mounted on the tank means for receiving water from the water outlet passage, said tubular means having first opening means adjacent the first end thereof open to the tubular means passage and chamber, said second end having second opening means open to the tubular means passage and chamber whereby water in the lower portion of the chamber flows through said first opening means into the tubular means passage and out of the second opening means to the upper portion of said chamber and water in the upper portion of the chamber flows to the lower portion of the chamber when the temperature of the water in the lower portion of the chamber is greater than the temperature of the water in the upper portion of the chamber.

28. The apparatus of claim 27 wherein: said second opening means includes at least one hole in the second end of the tubular means.

29. The apparatus of claim 27 wherein: said second opening means includes second hole means in the second end of the tubular means.

30. The apparatus of claim 27 wherein: said tubular means is a generally cylindrical tubular member located along the longitudinal axis of the chamber.

31. The apparatus of claim 27 including: second tank means connected to the water outlet means for receiving water therefrom, said second tank means having a chamber for storing water.

32. The apparatus of claim 31 including: animal operated means mounted on the second tank means for dispensing water from said second tank means.

33. The apparatus of claim 31 wherein: said second tank means is located above said first tank means, said first tank means being adapted to be located below ground.

* * * * *